US007646764B2

(12) United States Patent
Jeon et al.

(10) Patent No.: US 7,646,764 B2
(45) Date of Patent: Jan. 12, 2010

(54) IP NETWORK AND COMMUNICATION METHOD THEREIN

(75) Inventors: Seong-Joon Jeon, Yongin-si (KR); Myeon-Kee Youn, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 53 days.

(21) Appl. No.: 11/526,775

(22) Filed: Sep. 26, 2006

(65) Prior Publication Data

US 2007/0104191 A1 May 10, 2007

(30) Foreign Application Priority Data

Nov. 4, 2005 (KR) ............... 10-2005-0105647

(51) Int. Cl.
*H04L 12/66* (2006.01)
*H04M 3/00* (2006.01)

(52) U.S. Cl. ............... 370/352; 370/356; 370/385; 370/462; 455/418; 455/435.2; 455/552.1; 709/228

(58) Field of Classification Search ............... 370/352, 370/356, 391, 401, 385, 462; 379/32.01, 379/67.1, 230; 381/370; 455/416, 413, 417, 455/418, 435.2, 450, 466, 552.1, 553.1; 709/228
See application file for complete search history.

(56) References Cited

U.S. PATENT DOCUMENTS 7,283,829 B2 * 10/2007 Christenson et al. ........ 455/461

| 2003/0096627 | A1* | 5/2003 | Rasanen et al. ............... 455/466 |
| 2005/0068936 | A1* | 3/2005 | Keskiniva et al. ............ 370/352 |
| 2005/0141490 | A1* | 6/2005 | Dolan ........................... 370/352 |
| 2005/0277408 | A1* | 12/2005 | Stuckman et al. ............ 455/415 |
| 2007/0043687 | A1* | 2/2007 | Bodart et al. ................... 707/1 |
| 2007/0071192 | A1* | 3/2007 | Smith et al. ............... 379/93.12 |
| 2007/0071224 | A1* | 3/2007 | Shtivelman et al. ...... 379/265.02 |
| 2007/0081640 | A1* | 4/2007 | Jachner ..................... 379/88.16 |
| 2007/0116223 | A1* | 5/2007 | Burke et al. ............. 379/201.12 |

FOREIGN PATENT DOCUMENTS

| CN | 1568605 | 1/2005 |
| KR | 10-2004-0041689 | 5/2004 |
| KR | 10-2003-0017495 | 3/2005 |
| KR | 10-2005-0071771 | 7/2005 |

OTHER PUBLICATIONS

Office action from Chinese Patent Office issued in Applicant's corresponding Chinese Patent Application No. 2006101374553 dated Apr. 17, 2009.
Korean Office Action for Korean Patent Application No. 2005-0105647 issued on Nov. 17, 2006.
Korean Decision of Grant for Korean Patent Application No. 2005-0105647, issued on May 17, 2007.

* cited by examiner

*Primary Examiner*—Harry S Hong
(74) *Attorney, Agent, or Firm*—Robert E. Bushnell, Esq.

(57) ABSTRACT

An IP network and a communication method therein. The IP network includes a first terminal adapted to make an outgoing call and a second terminal adapted to transmit information on a plurality of serviceable communication modes other than a communication mode of the call incoming from the first terminal depending upon whether the incoming call is connected.

20 Claims, 5 Drawing Sheets

<486 Busy Here Message>

Internet Protocol, Src: 165.213.107.14 (165.213.107.14), Dst: 165.213.107.19 (165.213.107.19)
  User Datagram Protocol, Src Port: 5080 (5080), Dst Port: 5060 (5060)
  Session Initiation Protocol
    Status-Line: SIP/2.0 486 Busy Here
    Message Header
      To: <sip:8500@imstesta1.com:5080>;tag=22a298-156bd5a5-13c4-34-6006ba91-34
        SIP to address: sip:8500@imstesta1.com:5080
        SIP tag: 22a298-156bd5a5-13c4-34-6006ba91-34
      Via: SIP/2.0/UDP 165.213.107.19:5060;branch=z9hG4bK-498-11f48b-1b1196f8
      Cseq: 1 INVITE
      From: <sip:9600@imstesta1.com>;tag=22ac58-136bd5a5-13c4-498-69b3f67e-49
        SIP from address: sip:9600@imstesta1.com
        SIP tag: 22ac58-136bd5a5-13c4-498-69b3f67e-498
      Call-ID: 22b9b8-136bd5a5-13c4-498-437130b2-498@imstesta1.com
      Content-Length: 229

```
Message body
  Session Description Protocol
    Session Description Protocol Version (v): 0
    Communication type
      PTT : Push to Talk
      PTV : Push to Video
      PTD : Push to Data
      IM  : Instant Messaging
      MMC : Multi Media Conferencing
```
— 600

IP NETWORK AND COMMUNICATION METHOD THEREIN

CLAIM OF PRIORITY

This application makes reference to, incorporates the same herein, and claims all benefits accruing under 35 U.S.C. §119 from an application for IP NETWORK AND COMMUNICATION METHOD THEREIN earlier filed in the Korean Intellectual Property Office on 4 Nov. 2005 and there duly assigned Serial No. 10-2005-0105647.

BACKGROUND OF THE INVENTION

1. Field of the Invention

The present invention relates to an IP network and a communication method therein, and more particularly, to an IP network and a communication method therein for exchanging information on a common communication mode between terminals when a terminal communicating in an IP-based network such as a WLAN or Wibro supports several communication modes such as Voice over IP (VoIP) and Push to Talk (PTT).

2. Description of the Related Art

In recent years, various communication interfaces, such as wireless local area network (WLAN), wireless broadband Internet (Wibro), World Interoperability for Microwave Access (WiMax), and high-speed downlink packet access (HSDPA), are appearing, and various communication services using the various communication interfaces are being provided to users. One typical communication interface is code division multiple access (CDMA), generally used for voice communication service in Korea. Another is wireless local area network (WLAN), capable of high-speed Internet access through a personal digital assistant (PDA) or a notebook computer within a predetermined distance from a place where an access point (AP) is installed. Yet another is high-speed portable Internet WiBro (Wireless Broadband Internet), targeting not only ordinary data communication but also high-quality multimedia data communication based on quality of service (QoS), such as voice and video communication, using a frequency of 2.3 GHz. Still another is high-speed downlink packet access (HSDPA), a 3.5 generation version with an improved wireless Internet download speed, having an Internet transfer rate of a personal computer (PC), and mainly providing voice/video phone service and high-quality data service based on QoS.

The communication service provided through the communication interface may be VoIP (Voice over IP), VT (Video Telephony), PTT (Push To Talk), PTV (Push To Video), PTD (Push To Data), IM (Instant Messaging), or MMC (Multi Media Conference). VoIP is a communication mode in which a party is called using a dialer such as a general portable phone or using a buddy list, and voice packets are transmitted through an IP network. VT is a communication mode in which video data is communicated in addition to voice packets of VoIP.

PTT supports point-to-multi (group) communication in a packet network (wireless Internet), and is a signal that voice networks (circuit networks) and IP networks (packet networks) are moving into an age of "all IP networks". In other words, PTT is the result of a trend of all wire/wireless network environments to be integrated with and developed into Internet protocol. PTT allows a member of one group having a terminal to communicate with other members of the same group, and is generally dependent on a single frequency, that is, on a dedicated channel. Since a dedicated channel is used, PTT is inevitably a half-duplex communication mode in which data can be transmitted in two ways, but not at the same time. In other words, when one party transmits data, the other party can only receive the data and cannot transmit data until reception is complete.

PTV is a technology in which live video can be transmitted in real time to several receivers at the same time. This technology provides a moving picture conference function, which however enables only one-way transmission. When a user desires, the one-way transmission can be to several recipients at the same time. Therefore, owing to its ability to provide the moving picture conference function at considerably low cost, PTV is regarded as a new key application in future third generation (3G) service. Like a messenger service widely used in PCs in recent years, in PTV, a user can manage a user group and be aware of a call recipient's reception or non-reception of transmitted data. Thus, not only can a plurality of contacts be designated and a moving picture conference be held, but a control function prevents conference participants from transmitting moving picture data at the same time. PTD provides a service enabling transmission of data to a plurality of recipients at the same time.

Push-to-all (PTA) supports PTT, PTV, and PTD services. In other words, PTA makes it possible to perform PTT, PTV, and PTD between one point and multiple other points. PTA can be applied in an asynchronous 2.5 generation (2.5G) edge terminal, a wide code division multiple access (WCDMA) terminal, a Wireless Fidelity (WiFi) terminal, and networks for these terminals. Meanwhile, IM refers to a computer application for instant text communication between two or more persons through a network such as the Internet, and MMC refers to a service allowing several users to concurrently communicate voice and video.

As communication modes become more diverse, user terminals become more diverse in kind, and terminals to which several communication modes are applied are beginning to appear. Even in a complex terminal to which several communication modes are applied, only a selected communication mode is used, and different communication modes are not compatible with each other. With new technology appearing daily, there is a substantial drawback in incorporating all communication modes into one complex terminal.

When a user attempts communication using a desired communication mode, not knowing whether the other party's terminal supports and is currently set up to use the communication mode, communication may not be possible due to communication mode incompatibility. Accordingly, what is needed is a communication system in which a call recipient's terminal is notified of possible communication modes of a caller's terminal and allows the recipient to select one of the communication modes.

SUMMARY OF THE INVENTION

It is therefore an object of the present invention to provide an improved IP network that contains terminals that notify each other of available communication modes.

It is also an object of the present invention to provide a method of communicating in an IP network where one terminal discloses which communication modes are available.

It is still an object of the present invention to provide an IP network and a communication method therein in which common communication modes are exchanged between communication terminals using signaling initiation protocol (SIP), and communication is performed based on a selected communication mode.

According to an aspect of the present invention, there is provided an IP (Internet protocol) network, including a first terminal adapted to make an outgoing call and a second terminal adapted to transmit information on a plurality of serviceable communication modes other than a communication mode of the call incoming from the first terminal depending upon whether the incoming call is connected.

The information on the plurality of communication modes can be included and transmitted in a session initiation protocol (SIP) message. The first terminal can be adapted to include information on a plurality of serviceable communications modes in an SIP INVITE message, the first terminal can be further adapted to transmit the SIP INVITE message comprising the information on the plurality of serviceable communications modes to the second terminal upon making the outgoing call. The second terminal can be further adapted to receive the information on the possible plurality of communication modes of the first terminal from the first terminal, the second terminal can be further adapted to display each of the plurality of communication modes of the first terminal on a screen. The first terminal can be adapted to receive the information on the plurality of communication modes of the second terminal from the second terminal, the first terminal can be further adapted to display each of the plurality of communication modes on a screen. Upon a user of the first terminal selecting one of the plurality of displayed communication modes of the second terminal, the first terminal can be further adapted to transmit a call attempt message to the second terminal in the selected communication mode.

Each of the plurality of communication modes can use a communication service selected from the group consisting of VoIP (Voice over IP), VT (Video Telephony), PTT (Push To Talk), PTV (Push To Video), PTD (Push To Data), IM (Instant Message), and MMC (Multi Media Conference). The IP network can use a communications interface selected from the group consisting of CDMA (code division multiple access), WLAN (wireless local area network), Wibro (wireless broadband Internet), WiMax (World Interoperability for Microwave Access), and HSDPA (high-speed downlink packet access) communication interfaces.

The second terminal can be adapted to convert the information on the plurality of serviceable communication modes other than the communication mode of the incoming call into a message form upon being in a busy state, the second terminal can be further adapted to include the information on the plurality of serviceable communication modes other than the communication mode of the incoming call in a message form in a session description protocol (SDP) body portion of a 486 Busy Here message, the second terminal can be further adapted to transmit the 486 Busy Here message comprising the information on the plurality of serviceable communication modes other than the communication mode of the incoming call to the first terminal.

Upon a user of the second terminal selecting to communicate with the first terminal in a communication mode other than the communication mode of the incoming call, the second terminal can be adapted to convert the information on the plurality of serviceable communication modes other than the communication mode of the incoming call into message form, the second terminal can be further adapted to include the information in message form in a session description protocol (SDP) body portion of a 200 OK message, and the second terminal can be further adapted to transmit the included information to the first terminal.

According to another aspect to the present invention, there is provided a communication method in an IP network, the method including making an outgoing call from a first terminal to a second terminal and transmitting, from the second terminal to the first terminal, information on a plurality of serviceable communication modes of the second terminal besides a communication mode of the call from the first terminal, depending on whether the call is connected. The method can further include receiving, at the second terminal, the information on the plurality of possible communication modes of the first terminal and displaying each of the communication modes of the first terminal on a screen at the second terminal. The method can further include receiving, at the first terminal, the information on the plurality of communication modes of the second terminal from the second terminal and displaying each of the communication modes on a screen at the first terminal. The method can further include transmitting, by the first terminal to the second terminal, a call attempt message in a selected communication mode from the first terminal to the second terminal upon a user of the first terminal selecting the selected communication mode from the displayed plurality of communication modes of the second terminal.

Each of the plurality of communication modes can use a communication service selected from the group consisting of VoIP (Voice over IP), VT (Video Telephony), PTT (Push To Talk), PTV (Push To Video), PTD (Push To Data), IM (Instant Message) and MMC (Multi Media Conference). The IP network can use at least one communication interface selected from the group consisting of CDMA (code division multiple access), WLAN (wireless local area network), Wibro (wireless broadband Internet), WiMax (World Interoperability for Microwave Access), and HSDPA (high-speed downlink packet access) communication interfaces.

The information on the plurality of communication modes can be included and transmitted in a session initiation protocol (SIP) message. During the transmitting of the outgoing call from the first terminal, information on a plurality of serviceable communication modes of the first terminal can be inserted and transmitted in a SIP INVITE message of the outgoing call.

The transmitting, from the second terminal to the first terminal, of the information on the plurality of other serviceable communication modes of the second terminal besides the communication mode of the call from the first terminal can include converting the information on the plurality of serviceable communication modes of the second terminal other than the communication mode of the incoming call into message form upon the second terminal being in a busy state, preparing a 486 Busy Here message, inserting the converted information on the plurality of communication modes into an session description protocol (SDP) body portion of the 486 Busy Here message and transmitting the prepared 486 Busy Here message comprising the converted information on the plurality of communication modes to the first terminal.

The transmitting, from the second terminal to the first terminal, of the information on a plurality of other serviceable communication modes of the second terminal besides the communication mode of the call from the first terminal can include converting the information on the plurality of serviceable communication modes of the second terminal other than the communication mode of the incoming call to the second terminal into message form upon the second terminal being in an idle state or upon a user of the second terminal selecting to communicate with the first terminal in a communication mode other than the communication mode of the incoming call, preparing a 200 OK message, inserting the converted information on the plurality of communication modes into a session description protocol (SDP) body portion of the 200 OK message and transmitting the prepared 200 OK message to the first terminal.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
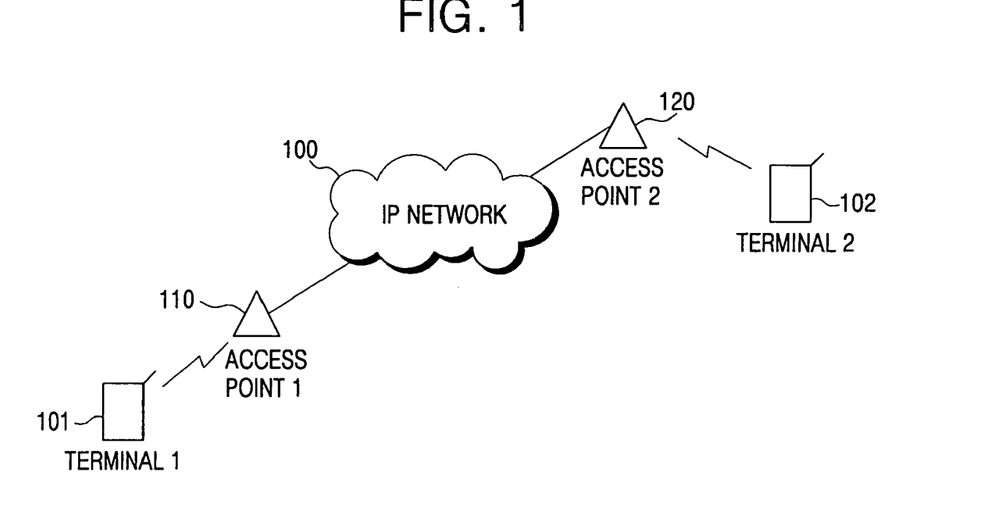
FIG. 1 is a view of a construction of a network according to the present invention.

Turning now to the figures, FIG. 1 illustrates a construction of a network according to the present invention. The network of FIG. 1 can be a code division multiple access (CDMA) network, a wireless local area network (WLAN), a wireless broadband Internet (Wibro) network, a World Interoperability for Microwave Access (WiMax) network or a high-speed downlink packet access (HSDPA) network. As long as the network uses Internet protocol (IP), it can have any interface.

A terminals within the network should also support the same interface used in the network to make it possible to communicate over the network. In other words, if the network 100 of FIG. 1 is a WLAN, an access point 1 110 and an access point 2 120 will be access points (AP), and a terminal 1 and a terminal 2 will be WLAN terminals. Further, if the network 100 of FIG. 1 is a CDMA network, the access points 1 110 and 2 120 should be base transceiver systems, and terminals 1 and 2 should be CDMA terminals to make it possible to communicate between terminals 1 and 2 via the network.

According to the present invention applicable to the above-described IP network, when terminal 1 101 attempts to access to terminal 2 102 using a specific communication mode, terminal 1 101 first gives terminal 2 102 information on its executable communication modes and makes terminal 2 102 select any one of them to perform communication. Further, in the case where terminal 1 101 attempts a call to communicate with terminal 2 102 using general voice communication, and terminal 2 102 is at that time already performing voice communication and is thus busy, terminal 2 102 transmits information on its executable communication modes other than the voice communication to terminal 1 101, so that terminal 1 101 can select one of the modes other than voice communication to communicate with terminal 2 102.

As mentioned above, the present invention is applicable to all networks using IP, irrespective of the kind of the interface such as WLAN and Wibro. In other words, the present invention is applicable to all cases where several communication modes, such as Voice over IP (VoIP), video telephony (VT), Push To Talk (PTT), instant message (IM), Push To Data (PTD), and Push To Video (PTV), can be used in the network using the same interface.

Figure 2:
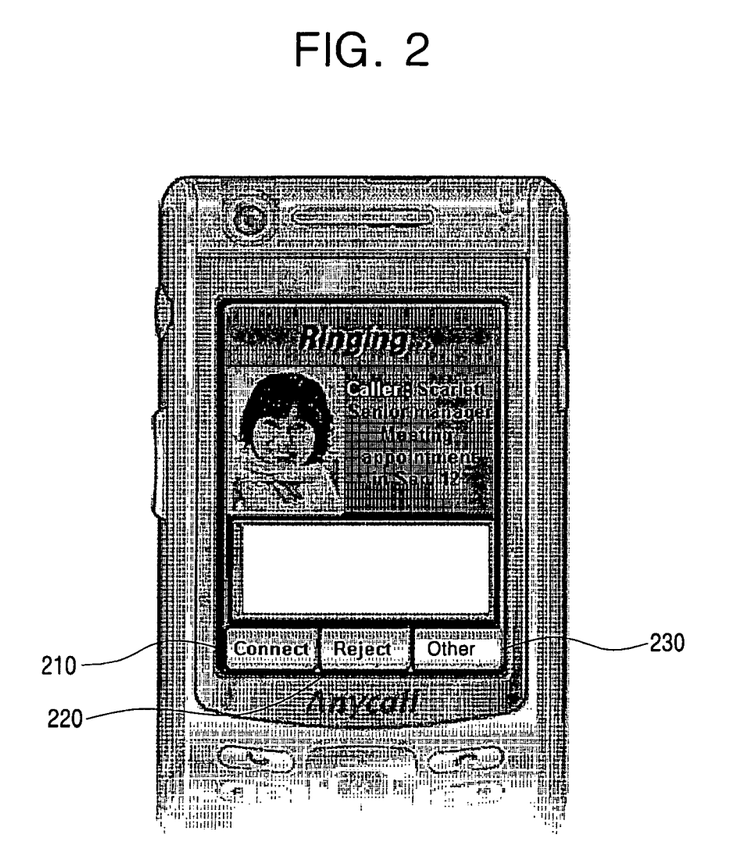
FIG. 2 is a view of a display screen of a receiver terminal according to an exemplary embodiment of the present invention.

Turning now to FIG. 2, FIG. 2 illustrates a display screen of a receiver terminal when a receiver terminal receives a call according to an exemplary embodiment of the present invention. As shown on the display screen of the receiver terminal of FIG. 2, the receiver terminal is currently in a ringing state. Further, information on the caller, that is a photograph, a name, a position, and a meeting engagement, is also displayed. This is possible when the information on the caller is already stored in the receiver terminal, or when the information is included and transmitted together with a control signal of an incoming call.

The receiver terminal provides three options as shown on the screen of FIG. 2. The options are Connect 210, Reject 220, and Other 230. Selection of the Connect 210 option sets and configures the receiver terminal to respond to a current incoming call. The Reject 220 option is for rejecting without responding to the incoming call. The Other 230 menu is for allowing a user at the receiving terminal to select a communication mode other than a currently incoming communication mode. The name of this third option is not limited to "Other" and can be expressed in other formats.

Figure 3:
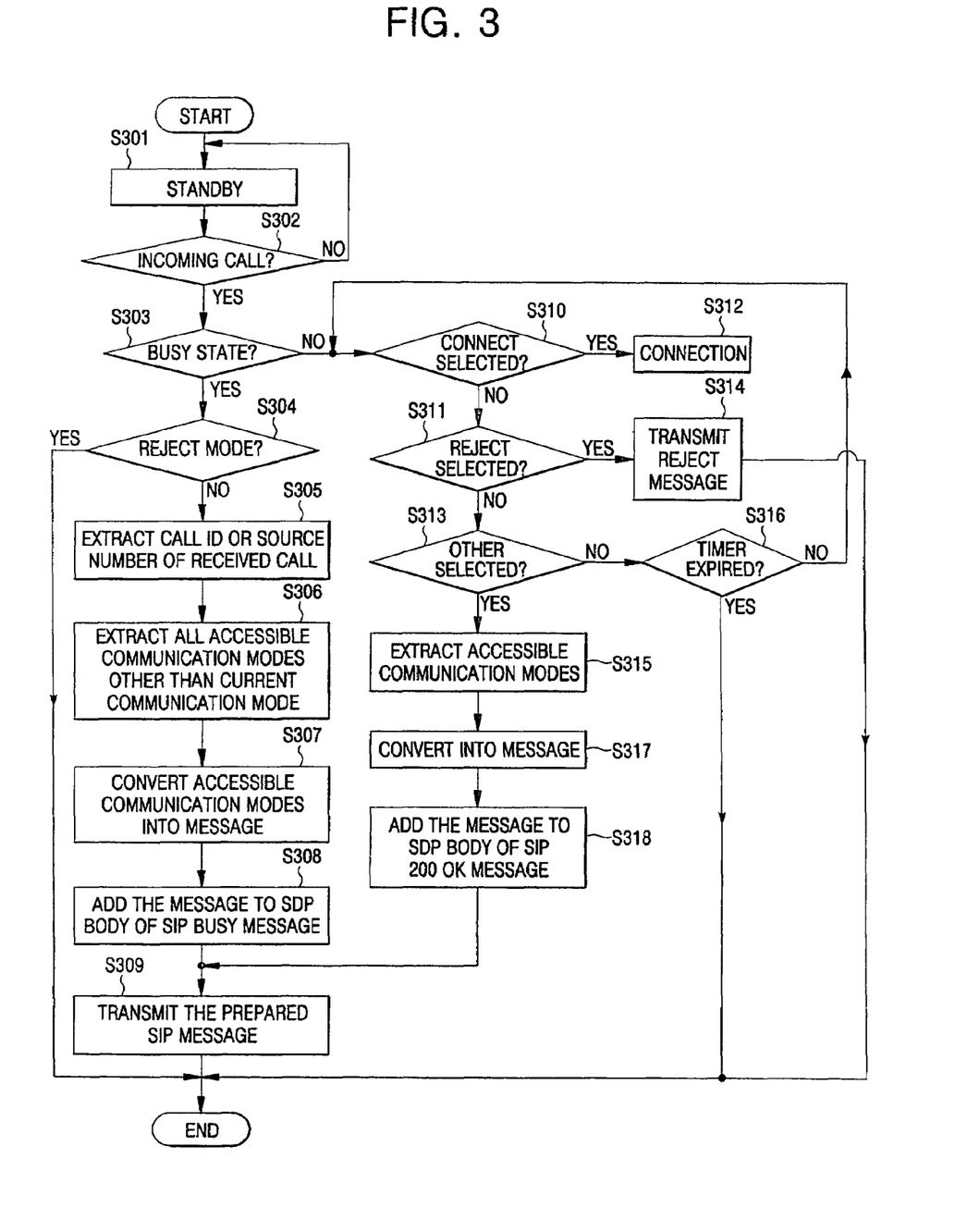
FIG. 3 is a flowchart illustrating an operation of a receiver terminal according to an exemplary embodiment of the present invention.

Turning now to FIG. 3, FIG. 3 is a flowchart illustrating an operation of the receiver terminal according to an exemplary embodiment of the present invention. The receiver terminal waits in a standby state (Step 301) until an incoming call is received (Step 302). Then, the receiver terminal checks whether or not its own status is busy (Step 303). When in a busy state, the process flow of FIG. 3 is substantially different than when the receiver terminal is in an idle state. First, the case of the busy state will be described.

In the case of the busy state ("Yes" in Step 303), the receiver terminal checks whether or not the receiver terminal is in call reject mode where calls are rejected when in the busy state (Step 304). When in the call reject mode, the process is terminated. It is to be understood that the process can also be terminated after the receiver terminal informs the caller terminal of being in the busy state. When in the busy state but not in the call reject mode, an identification (ID) or an outgoing number of the received call is extracted (Step 305), and all accessible communication modes other than the mode in which the receiver terminal is currently in the busy state are extracted (Step 306). A message is constructed using the extracted call ID or outgoing number, and one of the possible communication modes (Step 307). Contents for the accessible communication mode are added to a session description protocol (SDP) body portion of a session initiation protocol (SIP) message (Step 308). The SIP message having the SDP body portion added is a 486 Busy Here message informing that the receiver terminal is in the busy state. The extracted call ID or outgoing number is used in a "To" field representing a call-ID field or as a destination in a header portion of the 486 Busy message so that the corresponding message can be transmitted to the caller terminal. When the 486 Busy message is prepared in this way, the receiver terminal transmits the prepared SIP message to the caller terminal (Step 309).

When not in the busy state in Step 303, the receiver terminal provides an interface screen as in FIG. 2 allowing the user at the receiver terminal to select an option (Step 310). When the user of the receiver terminal selects Connect ("Yes" in Step 310), the receiver terminal performs call connection with the caller terminal in the mode of the incoming call (Step 312).

When the user selects Reject ("Yes" in Step 311), the receiver terminal transmits a call reject message to the caller terminal (Step 314), and the process is terminated. When the user desires to process a call in a different communication mode other than that requested by the caller terminal and selects Other ("Yes" in Step 313), all communication modes supported by the receiver terminal are extracted (Step 315), converted into a message (Step 317), and added to an SIP message. The SIP message may typically be a 200 OK message. Like in Step 308, the message for the communication mode is added to an SDP body portion of the 200 OK message (Step 318). The prepared SIP 200 OK message is transmitted to the caller terminal (Step 309). If the user of the receiver terminal does not select one of Connect, Reject, and Other before a predetermined time lapses, that is, if a standby timer ends ("Yes" in Step 316), the receiver terminal stops generating a ring signal and the process is terminated.

Figure 4:
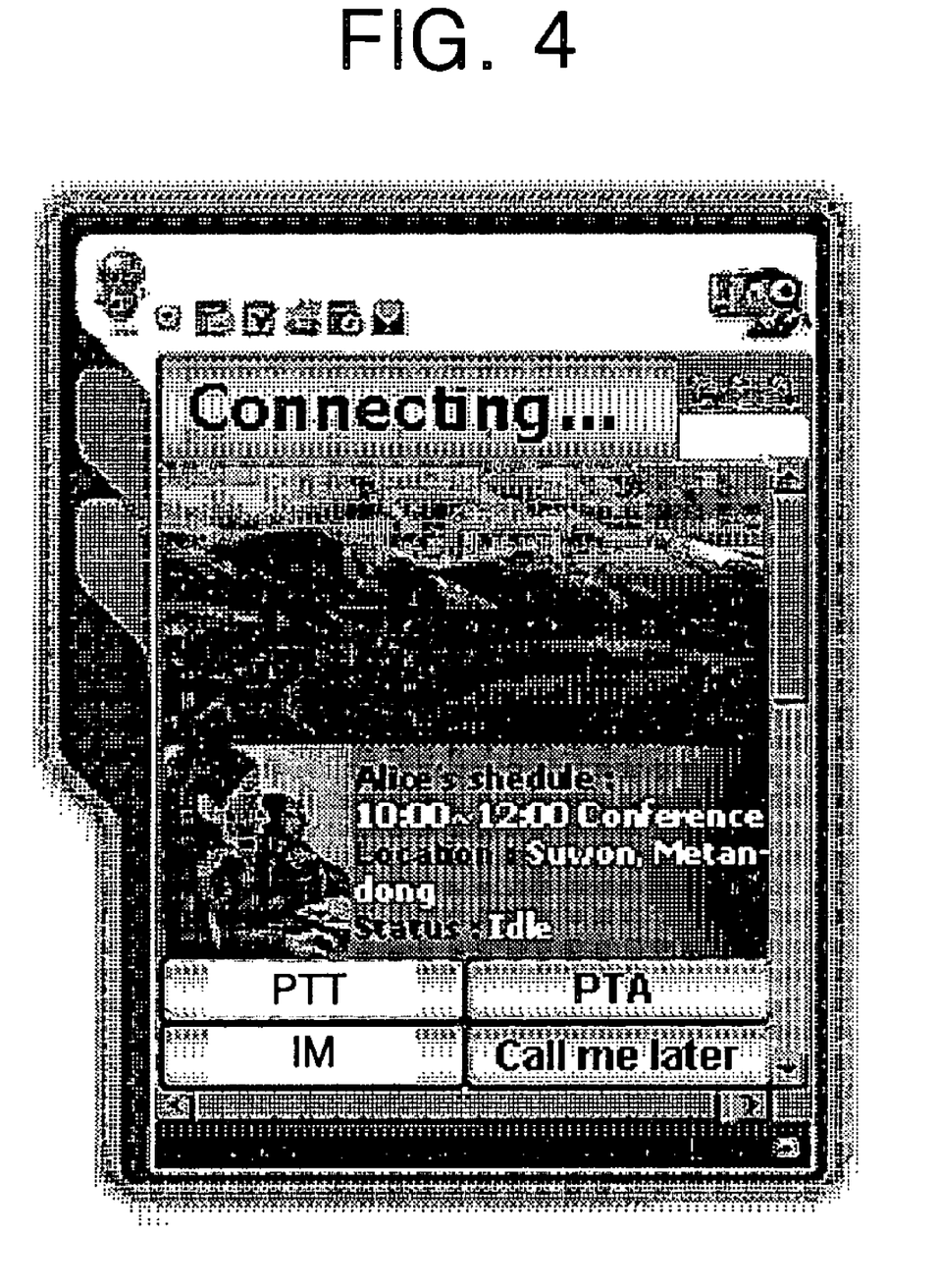
FIG. 4 is a view of a display screen of a caller terminal according to an exemplary embodiment of the present invention.

Turning now to FIG. 4, FIG. 4 illustrates a display screen of the caller terminal according to an exemplary embodiment of the present invention. The screen of FIG. 4 shows an example of a user interface screen of the caller terminal when the receiver terminal transmits a message listing its other executable communication modes without responding to a call request from the caller terminal. In the user screen of FIG. 4, it can be appreciated that the call recipient is Alice, who is currently in an idle state. Further, it can be appreciated that the communication service modes supported in the receiver terminal other than voice communication are PTT, PTA, and IM. From a state of the caller terminal of FIG. 4, it can be assumed that, since the caller does not select one of PTT, PTA, and IM supported by the receiver terminal, he/she desires voice communication with the call recipient.

Figure 5:
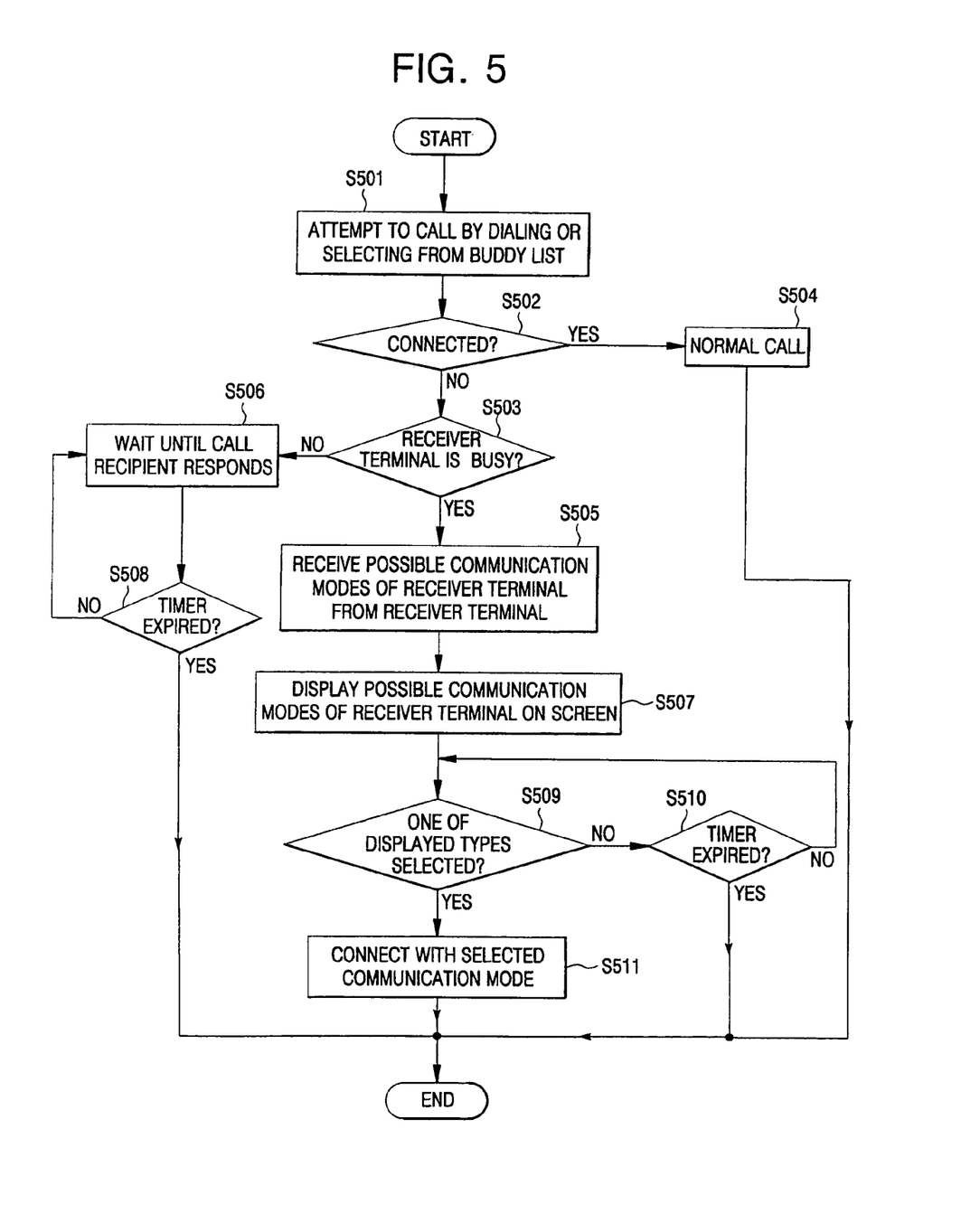
FIG. 5 is a flowchart illustrating an operation of a caller terminal according to an exemplary embodiment of the present invention.

Turning now to FIG. 5, FIG. 5 is a flowchart illustrating an operation of the caller terminal according to an exemplary embodiment of the present invention. The user of the caller terminal attempts a call (Step 501). The call attempt is made by direct dialing or selection from a Buddy List. When a call with the receiver terminal is connected in response to the call attempt ("Yes" in Step 502), a normal call is initiated with the receiver terminal (Step 504). When the receiver terminal informs the caller terminal of being in the busy state without responding to the call ("Yes" in Step 503), the caller terminal receives information on other possible communication modes of the receiver terminal, from the receiver terminal (Step 505). The caller terminal receives and displays the possible communication modes of the receiver terminal on a screen (Step 507). When the user of the caller terminal selects one of the displayed other communication modes ("Yes" in Step 509), a call attempt message is transmitted to the receiver terminal in the selected communication mode, and the call is connected (Step 511). When the user of the caller terminal does not desire connection using a different communication mode, and therefore does not take any action until the timer ends ("Yes" in Step 510), the process is terminated.

Meanwhile, when the receiver terminal is not in the busy state ("No" in Step 503), the caller terminal waits until the user of the receiver terminal responds (Step 506). If the user of the receiver terminal does not respond within a predetermined time, the timer ends ("Yes" in Step 508) and the process is terminated. Even in this case, when the SIP message including the information on possible communication modes is received from the receiver terminal, the corresponding information can be displayed and selected by the user at the caller terminal.

In a variation of the exemplary embodiment of FIG. 5, in Step 501 when the caller terminal makes an outgoing call, for example, when a session between the two terminals is set using the SIP message, information on other serviceable communication modes of the caller terminal may be loaded and transmitted in an INVITE message from the caller terminal. In this case, the caller terminal adds the serviceable communication modes of the caller terminal to a body portion of the INVITE message in message format, and transmits the added communication modes to the receiver terminal. The receiver terminal receives and displays the communication modes of the caller terminal for the user. When the user of the receiver terminal desires to communicate with the user of the caller terminal in a mode other than basic voice communication, he/she selects another communication mode in the ringing state. The receiver terminal again requests the caller terminal for the call in the newly selected communication mode.

Figure 6:
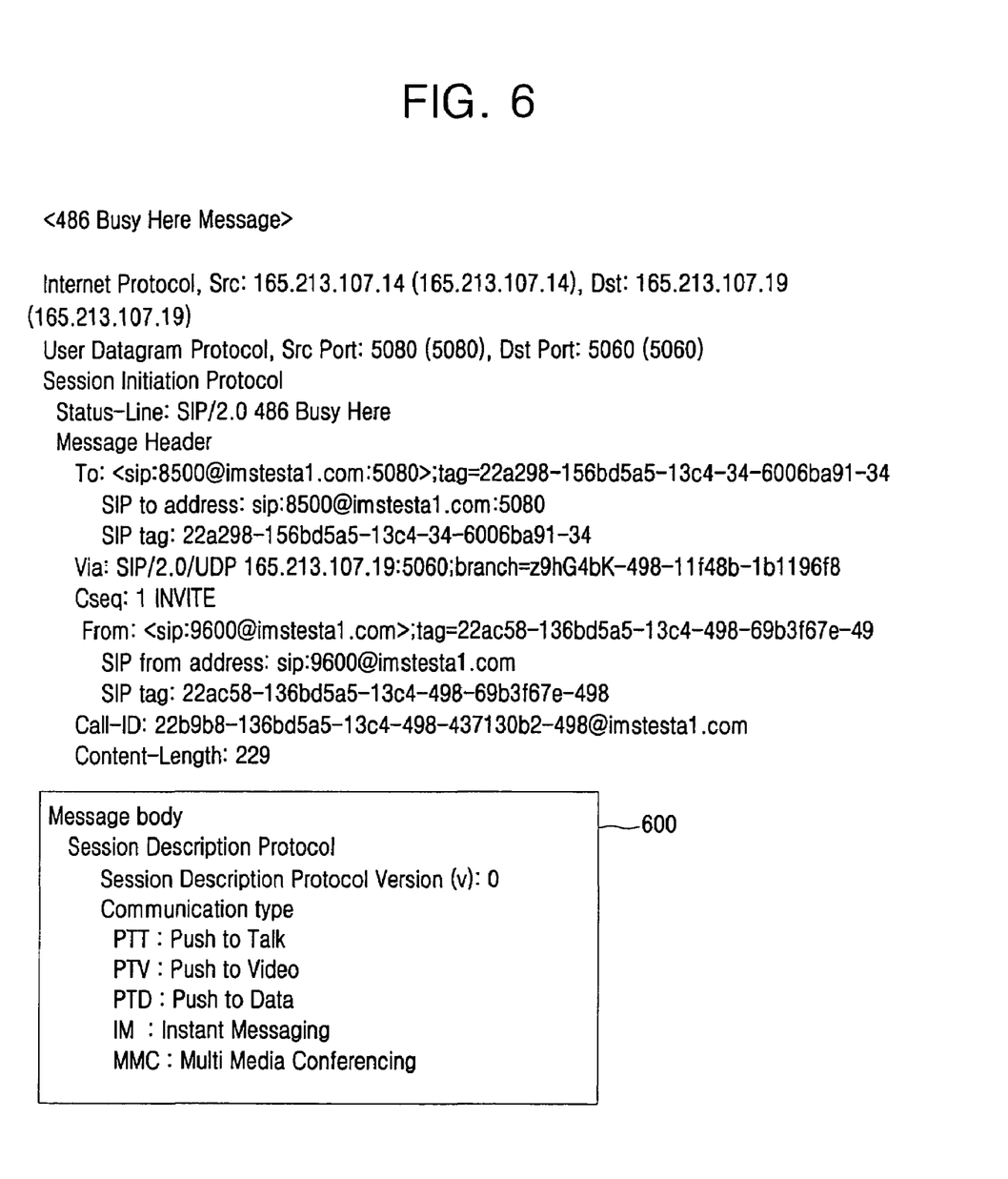
FIG. 6 is a view of a signaling initiation protocol (SIP) message for exchanging information regarding communication modes according to an exemplary embodiment of the present invention.

Turning now to FIG. 6, FIG. 6 illustrates an SIP message for exchanging information on communication modes according to an exemplary embodiment of the present invention. Several cases are possible in attempting communication, generally including cases where a normal path for communicating with the receiver terminal is set, the call recipient does not receive, and the receiver terminal is in the busy state. In FIG. 6, when the receiver terminal is in the busy state, a "486 Busy Here" message is transmitted to the caller terminal, in an exemplary embodiment.

SIP is a control protocol of an application layer, standardized in Internet Engineering Task Force Request For Comments 2543 (IETF RFC2543), for setting, modifying, and terminating multimedia sessions or calls for multimedia communication such as video and voice communication. SIP, a User Datagram Protocol/Transmission Control Protocol/Internet Protocol (UDP/TCP/IP) layer protocol, supports all unicast and multicast sessions so that a session can be initiated by invitation to a multimedia conference by a client/server protocol capable of transmitting/receiving SIP request message/SIP response message as request/response types.

In RFC2543, the SIP request message is provided with six basic functions such as INVITE (session participation invitation), ACK (acknowledgement of INVITE request), BYE (call termination), REGISTER (registration of a user agent to a database of a redirect server), CANCEL (cancellation of a pending request), and OPTIONS (Querying the capabilities of the server). Further, the SIP response message is provided, as a status code, with 1xx (Information response), 2xx (Successful response), 3xx (Redirection response), 4xx (Client error, and request failure), 5xx (Server failure), and 6xx (Global failure).

In communication using SIP, when a normal communication path is set, the receiver terminal receiving the 200 OK message from the caller terminal transmits a 100 Trying message and a 180 Ringing message to the caller terminal, and when the user of the receiver terminal acknowledges the response, the receiver terminal transmits the 200 OK message to the caller terminal, and the caller terminal transmits an ACK message thereof to the receiver terminal, thus setting up the SIP session.

When the receiver terminal does not respond to a communication request of the caller terminal, that is, does not receive the communication request, the caller terminal sequentially receiving the 100 Trying message and the 180 Ringing message from the receiver terminal transmits a CANCEL message to the receiver terminal, and terminates the call attempt in a state where the 200 OK message is not received before a predetermined time lapses.

When the receiver terminal is in the busy state as in FIG. 6, the receiver terminal transmits the 486 Busy Here message, instead of the 180 Ringing message, after the 100 Trying message. The 486 Busy Here message informs the caller terminal that the receiver terminal is currently in the busy state.

In a description of the "Message body" portion of contents of the 486 Busy Here message, it can be appreciated that a portion 600, including the information on communication modes, is included in the SDP portion including a description for the session. In the description of FIG. 6, it can be appreciated that PTT, PTV, PTD, IM, and MMC are supported communication modes of the receiver terminal. In other words, the present invention includes much more in the 486 Busy Here message than just a message header. However, in the present invention, the message body including the contents on the communication modes as in FIG. 6, is included in the 486 Busy Here message.

In the exemplary embodiments of the present invention, common communication modes between terminals is exchanged through transmission of a SIP message. While it is suggested that the information on communication modes be included in the body portion of the 486 Busy Here message or the 200 OK message, which are SIP messages recently increasing in use, the present invention is not limited to exchange of the communication mode using a SIP message. Therefore, the common communication modes between the terminals according to the present invention is also applicable to H.323, a protocol used in VoIP signaling, media gateway control protocol (MGCP), and Megaco.

The present invention has an effect in that the information on supported communication service modes is exchanged in the terminal service, thus making it possible to perform communication between the caller terminal and the receiver terminal using a different communication modes even while the receiver terminal performs voice communication with a third terminal.

While the present invention has been described with reference to exemplary embodiments thereof, it will be understood by those skilled in the art that various changes in form and detail may be made therein without departing from the spirit and scope of the present invention as defined by the following claims.

What is claimed is:

1. An IP (Internet protocol) network, comprising:
a first terminal making an outgoing call; and
a second terminal transmitting information for a plurality of serviceable communication modes that are supported by the second terminal and that are different from a communication mode of an incoming call from the first terminal, in dependence upon whether the incoming call is connected between the first terminal and the second terminal, with the incoming call from the first terminal being the outgoing call made by the first terminal.

2. The IP network of claim 1, wherein the information for the plurality of serviceable communication modes is included in and transmitted by a session initiation protocol (SIP) message.

3. The IP network of claim 2, wherein the first terminal transmits an SIP INVITE message including the information for the plurality of serviceable communications modes supported by the second terminal when the outgoing call is made by the first terminal.

4. The IP network of claim 3, wherein the second terminal further receives, from the first terminal, information for a plurality of serviceable communication modes supported by the first terminal, and the second terminal further displays each of the plurality of serviceable communication modes supported by the first terminal on a screen of a display device at the second terminal.

5. The IP network of claim 2, further comprising:
the second terminal converting the information for the plurality of serviceable communication modes supported by the second terminal different from the communication mode of the incoming call from the first terminal into a message form, when the second terminal is in a busy state;
the second terminal including the information for the plurality of serviceable communication modes supported by the second terminal different from the communication mode of the incoming call from the first terminal in a message form in a session description protocol (SDP) body portion of a 486 Busy Here message; and
the second terminal transmitting, to the first terminal, the 486 Busy Here message comprising the information for the plurality of serviceable communication modes supported by the second terminal different from the communication mode of the incoming call from the first terminal.

6. The IP network of claim 2, wherein, when a user of the second terminal selects to communicate with the first terminal in a communication mode different from the communication mode of the incoming call received from the first terminal, the second terminal converts the information for the plurality of serviceable communication modes that are different from the communication mode of the incoming call into message form, the second terminal further includes the converted information in a session description protocol (SDP) body portion of a 200 OK message, and the second terminal further transmits the 200 OK message including the converted information to the first terminal.

7. The IP network of claim 5, wherein the first terminal receives the information for the plurality of serviceable communication modes supported by the second terminal transmitted from the second terminal, and the first terminal further displays each of the plurality of serviceable communication modes supported by the second terminal on a screen of the first terminal.

8. The IP network of claim 7, wherein, upon a user of the first terminal selecting one of the displayed plurality of serviceable communication modes supported by the second terminal, and the first terminal further transmits a call attempt message to the second terminal in the selected one of the plurality of serviceable communication modes supported by the second terminal.

9. The IP network of claim 1, wherein each of the plurality of communication modes supported by the second terminal uses a communication service selected from a group comprising of VoIP (Voice over IP), VT (Video Telephony), PTT (Push To Talk), PTV (Push To Video), PTD (Push To Data), IM (Instant Message), and MMC (Multi Media Conference).

10. The IP network of claim 1, wherein the IP network uses a communications interface selected from a group comprising of CDMA (code division multiple access), WLAN (wireless local area network), Wibro (wireless broadband Internet), WiMax (World Interoperability for Microwave Access), and HSDPA (high-speed downlink packet access) communication interfaces.

11. A communication method in an Internet protocol (IP) network, comprising:
making an outgoing call at a first terminal for attempting to connect to a second terminal; and
transmitting, from the second terminal to the first terminal, information for a plurality of serviceable communication modes that are supported by the second terminal and that are different from a communication mode of an incoming call, in dependence upon whether the call is connected between the first terminal and the second terminal, with the incoming call being the outgoing call made by the first terminal.

12. The communication method of claim 11, wherein the information for the plurality of serviceable communication modes supported by the second terminal is included in and transmitted by a session initiation protocol (SIP) message.

13. The communication method of claim 12, wherein, during transmission of the outgoing call from the first terminal, information for a plurality of serviceable communication modes of the first terminal is inserted in and transmitted by a SIP INVITE message of the outgoing call made by the first terminal.

14. The communication method of claim 13, further comprising:
 receiving, at the second terminal, the information for the plurality of serviceable communication modes supported by the first terminal; and
 displaying each of the plurality of serviceable communication modes supported by the first terminal on a screen at the second terminal.

15. The communication method of claim 12, wherein the transmission, from the second terminal to the first terminal, of the information for the plurality of serviceable communication modes that are supported by the second terminal and that are different from the communication mode of the call from the first terminal is performed by:
 converting the information for the plurality of serviceable communication modes that are supported by the second terminal and that are different from the communication mode of the incoming call into message form upon the second terminal being in a busy state;
 preparing a 486 Busy Here message;
 inserting the converted information for the plurality of serviceable communication modes supported by the second terminal into an session description protocol (SDP) body portion of the 486 Busy Here message; and
 transmitting the prepared 486 Busy Here message comprising the converted information for the plurality of serviceable communication modes supported by the second terminal to the first terminal.

16. The communication method of claim 12, wherein the transmission, from the second terminal to the first terminal, of the information for the plurality of serviceable communication modes that are supported by the second terminal and that are different from the communication mode of the incoming call from the first terminal comprises:
 converting the information for the plurality of serviceable communication modes supported by the second terminal different from the communication mode of the incoming call into a message form upon the second terminal being in an idle state or upon a user of the second terminal selecting to communicate with the first terminal in a communication mode different from the communication mode of the incoming call;
 preparing a 200 OK message;
 inserting the converted information for the plurality of communication modes supported by the second terminal into a session description protocol (SDP) body portion of the 200 OK message; and
 transmitting the prepared 200 OK message comprising the converted information for the plurality of serviceable communication modes supported by the second terminal, to the first terminal.

17. The communication method of claim 15, further comprising:
 receiving, at the first terminal, the information for the plurality of serviceable communication modes supported by the second terminal transmitted from the second terminal; and
 displaying each of the plurality of serviceable communication modes supported by the second terminal on a screen at the first terminal.

18. The communication method of claim 17, further comprising:
 transmitting, by the first terminal to the second terminal, a call attempt message in a selected serviceable communication mode upon a user of the first terminal selecting a serviceable communication mode from the displayed plurality of serviceable communication modes supported by the second terminal.

19. The communication method of claim 11, wherein each of the plurality of serviceable communication modes uses a communication service selected from a group comprising of VoIP (Voice over IP), VT (Video Telephony), PTT (Push To Talk), PTV (Push To Video), PTD (Push To Data), IM (Instant Message) and MMC (Multi Media Conference).

20. The communication method of claim 11, wherein the IP network uses at least one communication interface selected from a group comprising of CDMA (code division multiple access), WLAN (wireless local area network), Wibro (wireless broadband Internet), WiMax (World Interoperability for Microwave Access), and HSDPA (high-speed downlink packet access) communication interfaces.

* * * * *

UNITED STATES PATENT AND TRADEMARK OFFICE
CERTIFICATE OF CORRECTION

PATENT NO. : 7,646,764 B2
APPLICATION NO. : 11/526775
DATED : January 12, 2010
INVENTOR(S) : Jeon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 106 days.

Signed and Sealed this

Twenty-eighth Day of December, 2010

David J. Kappos
*Director of the United States Patent and Trademark Office*